United States Patent
Brinks et al.

(10) Patent No.: US 9,027,907 B2
(45) Date of Patent: May 12, 2015

(54) LOW TORQUE, HIGH FLOW AND TIGHT SEALING TUBE BUTTERFLY VALVE

(75) Inventors: Barry T. Brinks, Fort Collins, CO (US); Shawn Justin Pollock, Timnath, CO (US)

(73) Assignee: Woodward, Inc., Fort Collins, CO (US)

( * ) Notice: Subject to any disclaimer, the term of this patent is extended or adjusted under 35 U.S.C. 154(b) by 565 days.

(21) Appl. No.: 13/117,988

(22) Filed: May 27, 2011

(65) Prior Publication Data

US 2012/0298900 A1 Nov. 29, 2012

(51) Int. Cl.
F16K 1/22 (2006.01)
F16K 1/226 (2006.01)

(52) U.S. Cl.
CPC ............... *F16K 1/222* (2013.01); *F16K 1/226* (2013.01)

(58) Field of Classification Search
CPC .................................. F16K 1/222; F16K 1/226
USPC ........... 251/305–308, 314, 316, 317; 123/337
See application file for complete search history.

(56) References Cited

U.S. PATENT DOCUMENTS

| | | | |
|---|---|---|---|
| 684,270 A * | 10/1901 | Kornreich | 126/292 |
| 3,033,513 A | 5/1962 | Vulliez | |
| 3,192,945 A * | 7/1965 | Blakeley | 137/375 |
| 3,284,046 A | 11/1966 | Allenbaugh, Jr. | |
| 3,290,001 A * | 12/1966 | Taylor | 251/175 |
| 3,601,364 A * | 8/1971 | Scaramucci | 251/306 |
| 3,666,235 A * | 5/1972 | Scott | 251/205 |
| 3,675,894 A | 7/1972 | Friedell | |
| 3,877,678 A * | 4/1975 | Jung | 251/305 |
| 3,937,441 A | 2/1976 | Baumann | |
| 4,482,128 A | 11/1984 | Boeckman et al. | |
| 4,634,098 A | 1/1987 | Varden | |
| 4,667,929 A | 5/1987 | Narduzzi | |
| 4,718,444 A | 1/1988 | Boelte | |
| 4,759,530 A * | 7/1988 | Iff | 251/306 |
| 4,768,750 A | 9/1988 | Wilson | |
| 5,118,078 A | 6/1992 | Younker | |
| 5,494,028 A | 2/1996 | DeVries et al. | |
| 6,793,197 B2 | 9/2004 | DePenning et al. | |
| 7,240,691 B2 * | 7/2007 | Bevan | 137/554 |
| 7,506,858 B2 | 3/2009 | Brinks | |
| 2002/0104510 A1 * | 8/2002 | Kotchi et al. | 123/337 |
| 2002/0109118 A1 | 8/2002 | Brinks | |

(Continued)

FOREIGN PATENT DOCUMENTS

| | | | |
|---|---|---|---|
| EP | 0625658 A2 | 11/1994 | |
| EP | 1593887 A1 | 11/2005 | |

(Continued)

*Primary Examiner* — John K Fristoe, Jr.
*Assistant Examiner* — Andrew J Rost
(74) *Attorney, Agent, or Firm* — Reinhart Boerner Van Deuren P.C.

(57) ABSTRACT

A butterfly valve including a valve body having a passage, a valve shaft assembly, a valve plate, and a tube that is friction fit inside the passage is provided. The valve shaft assembly includes a first shaft portion and a second shaft portion. The first and second shaft portions are in opposing spaced relation with the valve plate disposed therebetween. The valve plate has a flange such that when the butterfly valve is in the closed position a seal is formed with the tube, which is disposed within the fluid flow passage. The valve plate has lip extending from a portion of the valve plate that is radially outward from the circumference of the tube. The lip acts to reduce flow induced torque experienced while the valve plate is actuated from the closed to the open position.

21 Claims, 6 Drawing Sheets

(56) References Cited

U.S. PATENT DOCUMENTS

2004/0149952 A1    8/2004   DePenning et al.
2005/0224743 A1   10/2005   Boardman et al.
2007/0170391 A1*   7/2007   Liimatta et al. ............... 251/306

FOREIGN PATENT DOCUMENTS

| | | |
|---|---|---|
| GB | 2378233 A | 2/2003 |
| JP | 10-325472 A | 12/1998 |
| WO | 2008/100724 A1 | 8/2008 |

* cited by examiner

ID OF THE INVENTION

This invention generally relates to butterfly valves, and more specifically to butterfly valves used in turbine and industrial derivative engines.

BACKGROUND OF THE INVENTION

A conventional butterfly valve is a type of flow control device used to manage a flow of fluid through a section of pipe. The typical butterfly valve includes a hollow cylindrical valve body, a flat, circular valve plate, and a rotatable shaft. The valve plate is disposed within the housing at a point intermediate to the length of the cylindrical housing and secured to a lower portion of the rotatable shaft. An upper portion of the rotatable shaft is coupled to an actuator. During operation, movement of the actuator is translated to the valve plate. As the actuator moves, the valve plate is rotatably positioned within the valve body anywhere from perpendicular to parallel to the direction of the flow of fluid through the valve. When the valve plate is perpendicular to the fluid flow direction, the valve is closed and the fluid is restricted from flowing through the valve. In contrast, when the valve plate is parallel to the fluid flow direction, the valve is fully open and the fluid flow through the valve is at its maximum.

Conventional butterfly valves either have a clearance fit between the valve plate and the flow path to avoid wear, which results in high leakage rates, or have contact between the valve plate and the flow path. Since the radial stiffness of both the valve plate and the valve body are high, a butterfly valve with too low a clearance fit may require high actuation forces and risks jamming and/or high wear rates at any contacting points. The high wear rates of the contacting surfaces result in undesirable leakage of the valve in the closed position. To replace a worn valve plate and prevent further leakage, the valve shaft is removed to provide access to the plate. Removing the valve shaft is often an arduous and time consuming task and, therefore, changing a worn plate can be a difficult and lengthy process.

Moreover, standard butterfly valves sometimes require high actuation torque to move the valve plate, especially from a closed position to an open position. Such high actuation torque is due to, for example, high valve closed seating forces, unseating torques to open the valve after the valve was tightly closed, flow induced torque in the direction of closing the valve, and restrictions of the fully open flow path by the valve plate and shaft requiring a larger valve flow path diameter. As a result of requiring high actuation torque, larger and more costly actuators must be employed to open and close the valve.

A standard butterfly valve has the flow passage extending beyond the valve plate in both directions. Hence, the geometry modifications to the valve plate and shaft assembly, in order to reduce flow induced torque, are limited to locations inside the flow passage diameter when the valve is at any position. These modifications provide only minimal reduction of flow induced torque and may reduce the flow area of the fully open valve.

Further, standard butterfly valves require a valve plate and attendant support structure for the valve plate. In many cases the support structure even requires the valve passage way to be enlarged to accommodate the structure within the butterfly valve housing. The enlarged size of the butterfly valve, due to the support structure, is not only a disadvantage in terms of cost, but also present a disadvantage in certain applications where size and weight considerations are of particular interest.

In view of the above, there is a need for a butterfly valve that reduces the actuation forces needed to open and close the valve, and reduce the overall size and weight of the valve. Embodiments of the invention disclosed herein provide such a butterfly valve. These and other advantages of the invention, as well as additional inventive features, will be apparent from the description of the invention provided herein.

BRIEF SUMMARY OF THE INVENTION

In one aspect, a butterfly valve that provides for reduced actuation torque is provided. An embodiment of a butterfly valve according to this aspect has an open position to allow fluid flow therethrough, and a closed position to prevent fluid flow therethrough. The butterfly valve also includes a housing having an inlet and an outlet with a flow path extending from the inlet to the outlet. The butterfly valve also includes a valve member having a valve plate to selectively allow and prevent fluid flow from the inlet to the outlet along the flow path. A tube is positioned within the flow path and adjacent to the valve member to selectively form a seal therewith. The valve plate includes a radially-outwardly-projecting lip such that one portion of the valve plate extends radially beyond the outer periphery of the tube, and another portion of the valve plate does not extend radially beyond the outer periphery of the tube.

In certain embodiments the tube is made of a compliant material, and is friction fit inside the housing. In certain embodiments, the valve plate includes an axially-projecting flange that is normal to the direction of fluid flow when the valve member is in the closed position, the axially projecting flange forming a radial seal with an inner periphery of the tube when the valve is in the closed position thereby preventing fluid flow through the valve. In certain embodiments, the valve plate remains entirely in the flow path when the butterfly valve is in the open position.

In certain embodiments the valve plate is rotatable about ninety degrees between a fully closed position and a fully open position, and rotatable about ninety degrees between a fully open position and a fully closed position. In certain embodiments, the valve plate is a single continuous structure formed from a continuous piece of material. In certain embodiments, the valve plate has a variable thickness. In certain embodiments, the housing has a pocket projecting radially into an interior wall of the housing to accommodate the radially-outwardly-projecting lip of the valve plate.

In certain embodiments, the valve member includes a first shaft portion and a second shaft portion. The valve plate is interposed between the first and second shaft portions. The valve plate includes a mounting portion and a gate portion. The mounting portion connects the valve plate to the first and second shafts. An upper gap is formed between the gate portion and the first shaft portion. A lower gap is formed between the gate portion and the second shaft portion.

In another aspect, a butterfly valve that has low flow obstruction characteristics is provided. A butterfly valve according to this aspect has an open position to allow fluid flow therethrough, and a closed position to prevent fluid flow therethrough. The butterfly valve has a housing having an inlet and an outlet with a flow path extending from the inlet to the outlet. A tube is positioned within the flow path. The butterfly valve also includes a valve member having a first and a second shaft portions, with a valve plate extending therebetween. The valve plate has a gate portion and a mounting portion extending radially outward from the gate portion. The first and second shafts are connected to the valve plate at the mounting portion. The mounting portion defines an outer peripheral edge that is radially outward from an outer diameter of the tube and radially outward from an outer diameter of the gate portion.

In certain embodiments a radially-outwardly-projecting lip extends from the mounting portion, such that the valve plate is non-circular in shape. In certain embodiments, the first and second shaft portions are axially aligned with a gap between the first and second shaft portions and the gate portion. In certain embodiments, portions of the first and second shaft, and the mounting portion are downstream from the tube when the butterfly valve is in the open position. In certain embodiments, the flow path increases in diameter downstream of the tube. In certain embodiments, the mounting portion is thicker than the gate portion such that the valve plate has a variable thickness, and/or the tube is friction fit inside the housing.

In yet another aspect, a butterfly valve that has a longer service life due to replaceable wear parts is provided. An embodiment of a butterfly valve according to this aspect has an open position to allow fluid flow therethrough, and a closed position to prevent fluid flow therethrough. The butterfly valve includes a housing having an inlet and an outlet with a flow path extending from the inlet to the outlet. A tube is positioned within the flow path. The butterfly valve also includes a valve member having a first and a second shaft, with a valve plate extending therebetween. The valve plate has a mounting portion and a gate portion extending radially outward from the mounting portion. The mounting portion is connected to the first and second shafts at a circumference thereof such that rotation of the first and second shafts results in a like rotation of the gate portion. The butterfly valve also includes a compliant sealing flange extending circumferentially cross and axially outward from the mounting portion and the gate portion. The compliant sealing flange is axially received within an inner periphery of the tube in the closed position.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
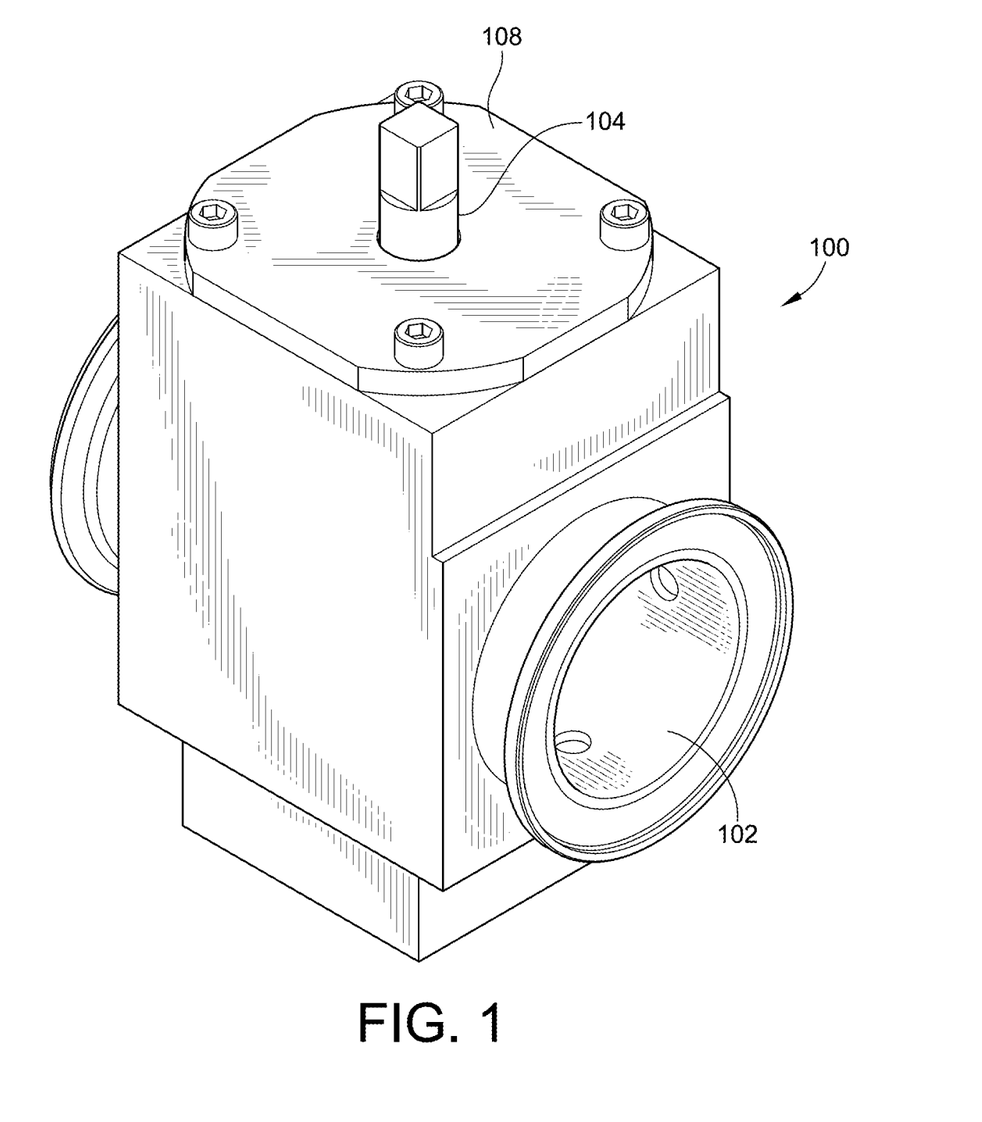
FIG. 1 is a perspective illustration of an embodiment of a butterfly valve according to the teachings of the present invention.

Turning now to the drawings, there is illustrated in FIG. 1 an embodiment of a butterfly valve 100 according to the teachings of the present invention. As discussed in detail in subsequent sections, the illustrated butterfly valve 100 provides for reduced actuation torque requirements, reduced size and weight, and reduced wear during opening and closing of the valve. These advantages are achieved, in part, due to the interaction between a tube 102 and a valve member 104 positioned within a housing 202 of the valve 100 as illustrated in FIG. 2.

Figure 2:
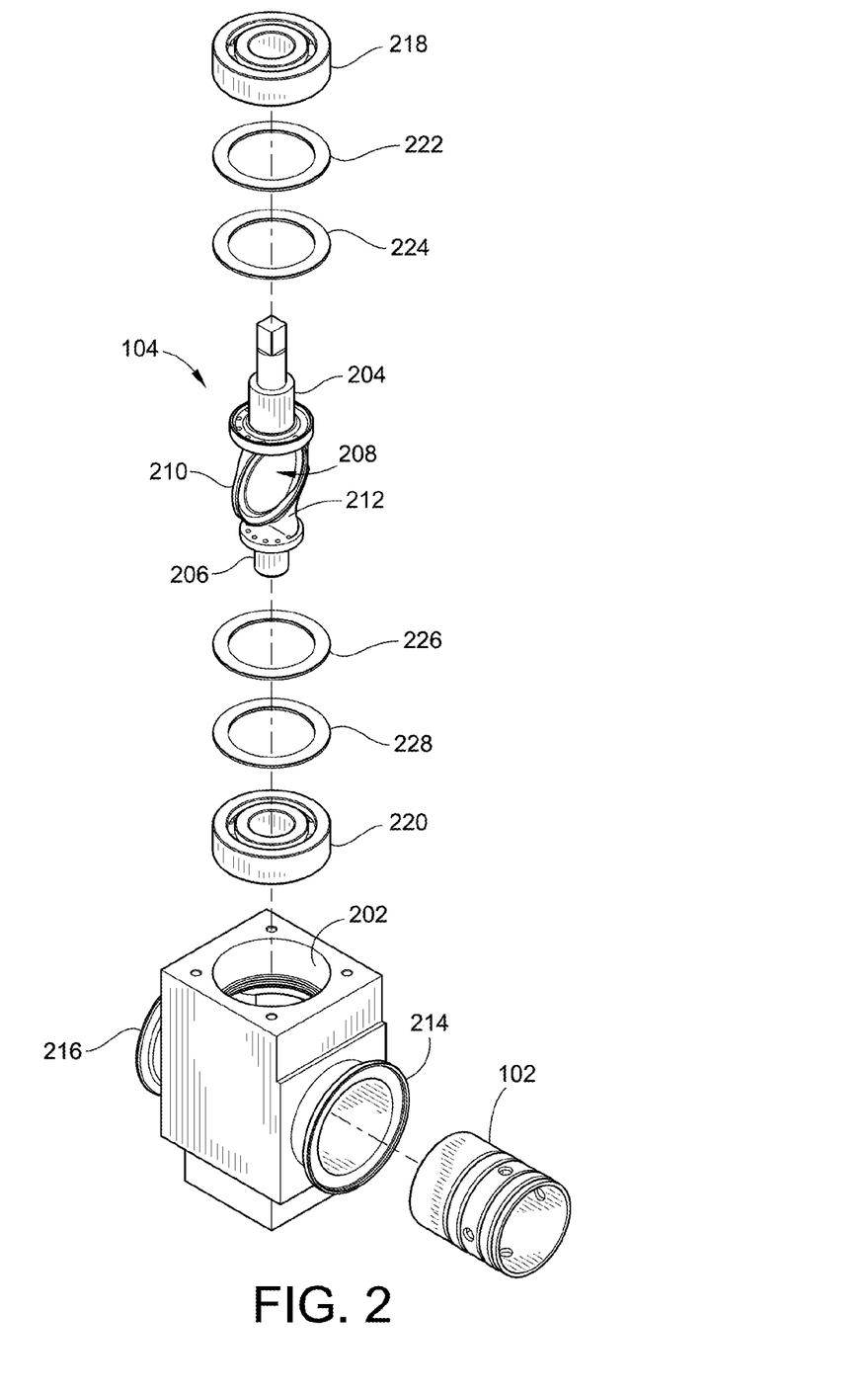
FIG. 2 is an exploded perspective view of the butterfly valve of FIG. 1.

FIG. 2 shows an exploded view of butterfly valve 100 comprising a tube 102, a housing in the form of valve body 202, a valve member 104, bearings 218, 220, and seals 222, 224, 226, 228. Valve member 104 is inserted into valve body 202, along a vertical axis, such that the valve member 104 can be rotatably actuated to allow or block fluid flow along the horizontal axis. The tube 102 is inserted into the valve body 202 and is situated within the valve body 202 such that it meets the valve plate 208 to form a seal when the valve member 104 is actuated to the closed position.

The valve member 104 is firmly held by bearing 218 and bearing 220. The bearings 218, 220 only allow the valve member 104 to rotate and restrict any horizontal motion. Further, seals 222, 224, 226, 228 are inserted between the bearings 218 and 220 and the valve plate 208 in order to restrict fluid flow to only the horizontal direction. A cover 108 (see FIG. 1) can be provided to enclose the above components within the valve body 202.

Additionally, the valve body 202 includes pipe coupling members 214, 216 formed at an inlet and an outlet, respectively, of the valve body 202. The pipe coupling members 214 and 216 generally permit the valve body 202 of the butterfly valve 100 to be secured to and/or placed in line with a pipe (not shown).

Figure 3:
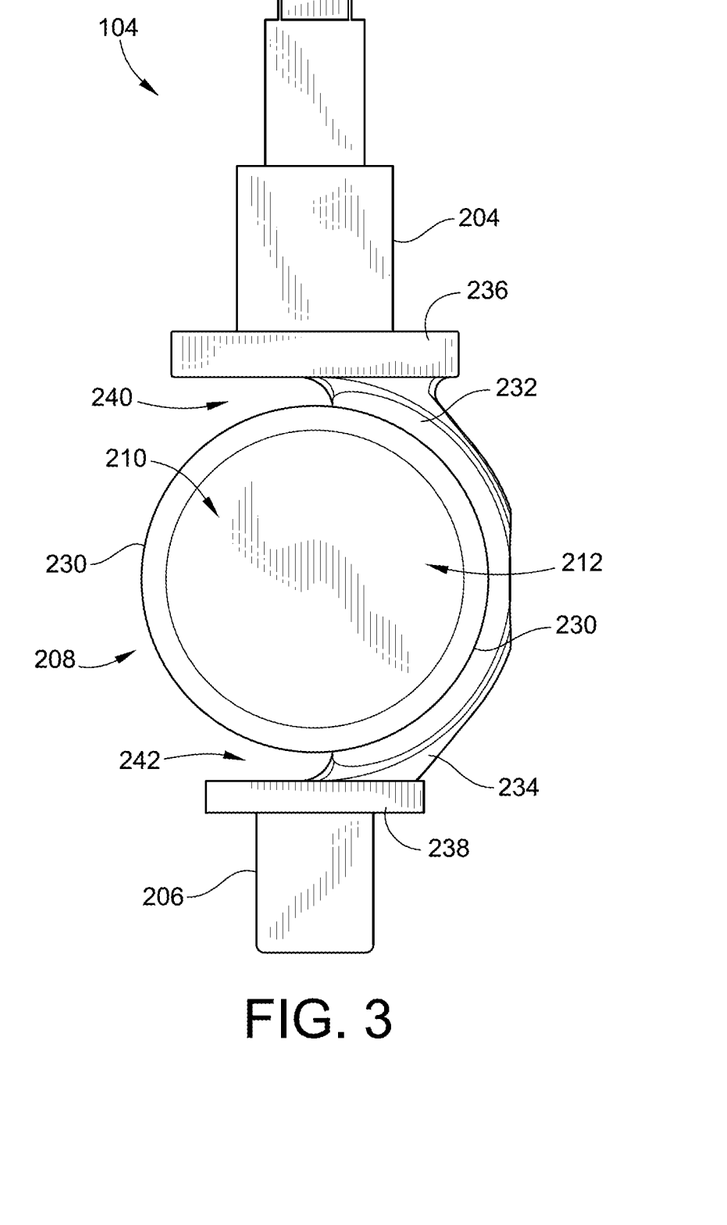
FIG. 3 is front view of a valve member of the butterfly valve of FIG. 1.

Having described the basic assembly and interrelation of the components of the valve 100, a more specific description of the valve member 104 is now provided with reference to FIG. 3. Valve member 104 includes a first shaft portion 204, a second shaft portion 206 and a valve plate 208 interposed between the first and second shaft portions 204, 206. Valve plate 208 has two distinct portions: 1) a gate portion 210 and a mounting portion 212.

The gate portion 210 projects radially outward from the mounting portion 212, and generally has a circular outer periphery with an annular flange 230 projecting normal to the page at FIG. 3 proximate the outer periphery. The gate portion 210 thus has a generally a semi-circular shape as it extends radially away from the mounting portion 212.

The mounting portion 212 also has a generally circular outer periphery, with the exception that a first neck portion 232 of the mounting portion 212 extends upwardly and is connected to terminal flange 236 of the first shaft 204. Similarly, a second neck portion 234 of the mounting portion 212 extends downwardly and is connected to a terminal flange 238 of the second shaft 206. The annular flange 230 continues from the gate portion 210 and extends across the mounting portion 212, and also continues to extend normal to the page at FIG. 3. As such, the annular flange 230 is continuous and extends from both the gate portion 210 and the mounting portion 212.

The section of the outer periphery of the mounting portion 212 extending between the first and second neck portions 232, 234 also has a generally semi-circular shape. However, the radius of curvature of the this section is greater than a radius of curvature of the gate portion 210, and a radius of curvature of the annular flange 230.

The aforementioned difference in the radii of curvature between the gate portion 210 and the mounting portion 212 results in an upper gap 240 between the gate portion 210 and the terminal flange 236 of the first shaft 204. Similarly, a lower gap 242 is formed between the gate portion 210 and the terminal flange 238 of the second shaft 206. As will be understood from the following, the upper and lower gaps 240, 242 allow the gate portion 201 to rotate into an interior space of tube 102 (see FIG. 4) which is bounded by an inner diameter thereof.

Figure 4:
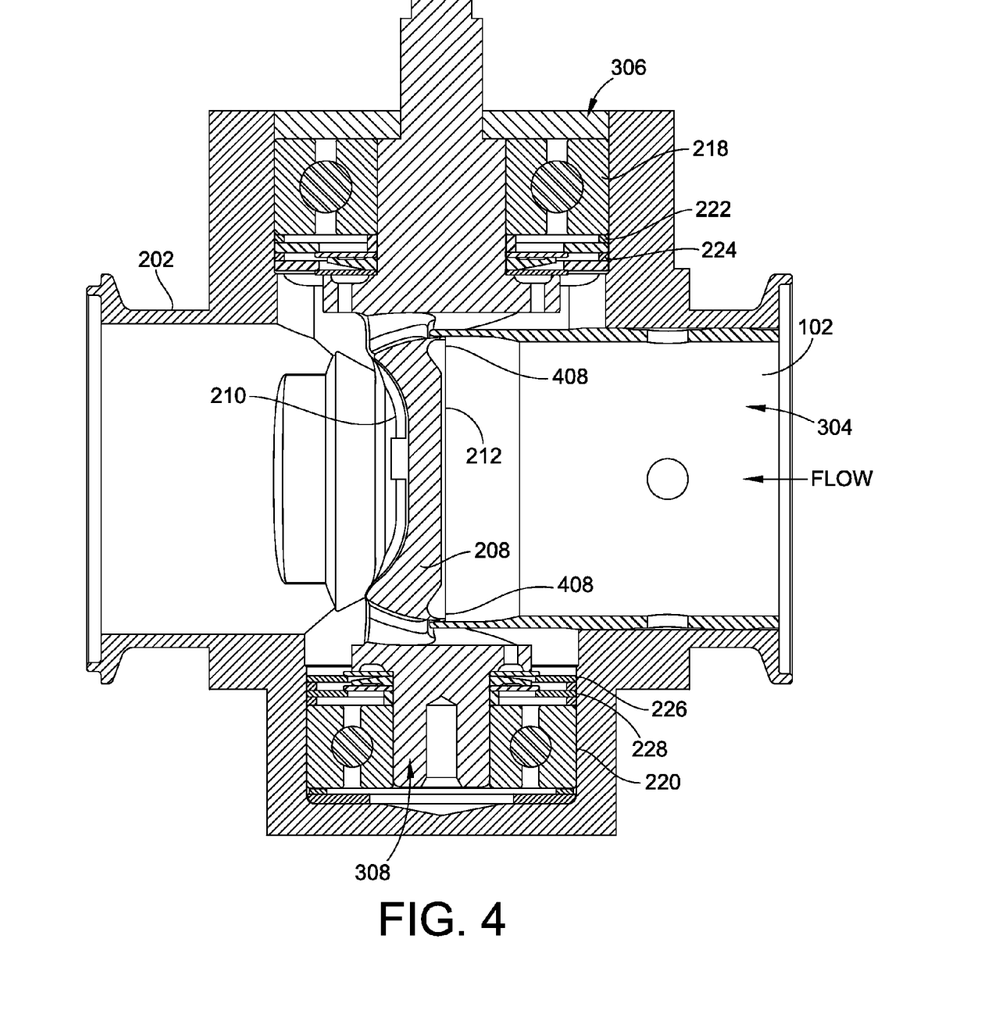
FIG. 4 is a cross section of the butterfly valve of FIG. 1.

FIG. 4 shows a cross section of the butterfly valve 100 in the closed position. The valve body 202 defines a passage 304. In the illustrated embodiment, the passage 304 is generally cylindrical and travels the length of the valve body 202 between pipe coupling members 214 and 216. Specifically, the passage 304 is configured to accommodate a flow of a fluid therethrough. Depending on the particular application of the butterfly valve 100, the fluid can be a gas, a liquid, a slurry, or a mixture thereof. Such fluids can include, for example, gaseous fuel, liquid fuel, water, and the like.

As shown in FIG. 4, the butterfly valve 100 includes a valve shaft aperture 306 and a recess 308. The recess 308 is generally a cylindrical cavity formed in the valve body 202. The recess 308 and the valve member aperture 306 are generally transverse to the passage 304 and are in opposing spaced relation with each other. The valve member aperture 306 and recess 308 are generally occupied by and/or filled with the valve member 104, sleeve bearings 218, 220, and seals 222, 224, 226, 228.

The first shaft portion 204 extends into the shaft member aperture 306, while the second shaft portion 206 is situated within the recess 308. Sleeve bearings 218, 220 are fit over the first and second shaft portions 204, 206, respectively, such that the bearing is interposed between the shaft portion(s) 204, 206 and the valve body 202. The first and second shaft portions 204, 206 are operably engaged with sleeve bearings 218, 220 at the shaft member aperture 306 and the recess 308, respectively, such that the valve member 104 can rotate relative to the valve body 202 and the passage 304.

In that regard, the first shaft portion 204 can be operably coupled to an actuator (not shown). The actuator can be, for example, a handle, an electrical motor drive actuator, a pneumatic actuator, a fuel-draulic actuator, and the like. The seals 222, 224, 226, 228 generally reduce or prevent leakage into the recess 308, or around the first shaft portion 204.

With particular reference now to the interaction between the tube 102 and the valve member 104, the annular flange 230 seats and seals partially within the tube 102 when the valve plate 208 is in the closed position, such that the two components overlap as shown. More specifically, an outer periphery of the annular flange 230 and an inner periphery of the tube 102 are in sealing contact with one another. Both the annular flange 230 and the tube 102 are radially compliant to readily allow insertion of the flange 230 into the tube 102 as shown.

In the illustrated embodiment, the valve plate 208, and indeed the valve member 104, are a single continuous component formed in a single operation such as molding or machining. However, it is contemplated that the valve member 104, or portions thereof, could be made of separate components. For example, the annular flange 230 could be formed on a removable plate that is later fastened onto the remainder of the valve plate 208.

Still referring to FIG. 4, the tube 102 is disposed within the passage 304 of the valve body 202. The tube 102 is generally a hollow, thin walled cylinder. As shown, the tube 102 starts near the centerline of the valve member 104 and extends away from the plate 208. The tube 102 is friction fit and/or fastened to the passage 304.

As introduced above, the tube 102 is preferably compliant both radially inward and radially outward when the butterfly valve 100 is in either the open or closed position. The radially compliant sealing flange 230 circumferentially extends across a surface of the valve member that is normal to the direction of flow in the closed position. This circumferential extension results in the flange 230 extending axially away from each of the gate and mounting portions 210, 212. Specifically, when the butterfly valve 100 is in the closed position, the compliant sealing flange 230 matches the radial compliance of the tube 102, as shown in FIG. 4. Also as introduced above, an outer diameter of the flange 230 is in contact with an inner diameter of the tube 102. As such, the two components are able to promote a constant seal contact pressure and require low actuation torque due to the temperature gradients, and pressure and temperature changes occurring while the valve is closed.

As illustrated in FIG. 4, tube 102 can be accessed via the end of the valve body 202, and more specifically the inlet side pipe coupling member 216. Therefore, should the tube 102 need to be replaced, it can easily be removed from the valve body 202 without having to remove the valve member 104 from the valve body 202. For example, the pipe coupling member 214 can be disengaged from the pipe (not shown) to expose the tube 102. The uncovered tube 102 can be extracted from the passage 304 by overcoming the friction fit and/or fastening components holding the tube 102 in place. With the worn tube removed, a new tube 102 can be fit into the passage 304.

Figure 5A:
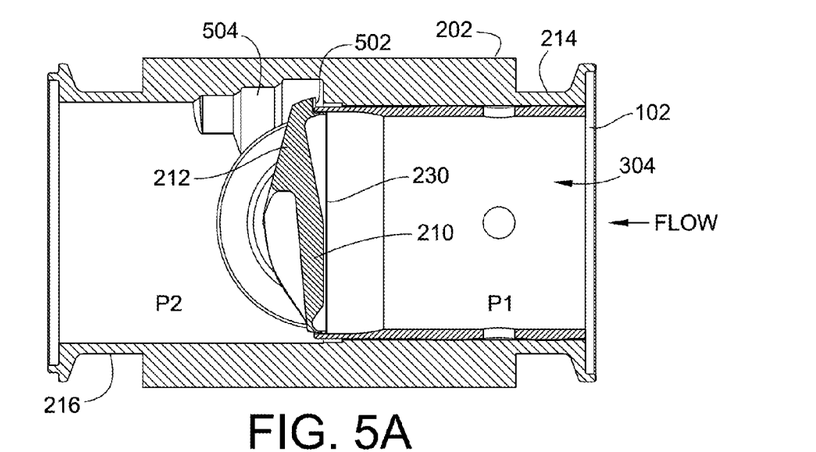
FIGS. 5A-5C are cross sectional views of the valve member of FIG. 3 moving through various positions to transition the butterfly valve of FIG. 1 between the closed position and the open position.
Figure 5B:
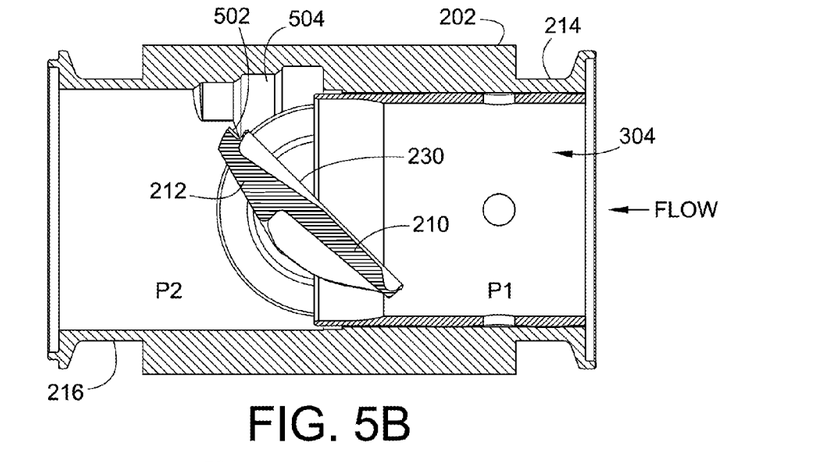
Figure 5C:
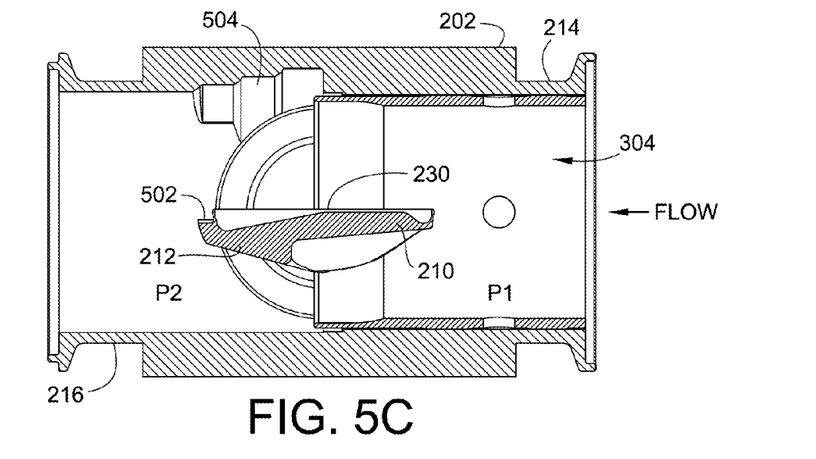

In FIGS. 5A, 5B, and 5C, a cross section of the butterfly valve 100 is shown transitioning from the closed to open position or state. FIG. 5A shows the valve plate 208 in a closed position; FIG. 5B shows the valve plate 208 45° open; and FIG. 5C shows the valve plate 208 fully open. This particular illustration shows the mounting portion 212 and the gate portion 210 of the valve plate 208 clearly. The mounting portion 212 includes a radially-outwardly-projecting lip 502 that extends radially beyond the tube 102 when the valve plate 208 is in the closed position.

As indicated in FIGS. 5A-5C the direction of fluid-flow is from right to left; thereby creating a pressure differential from one side of the valve plate 208 to the other. The two pressures are represented by P1 and P2. P1 represents the pressure of the upstream side where the fluid enters the butterfly valve 100 and P2 represents the pressure of the downstream side where the fluid exits the butterfly valve 100.

When the valve plate 208 is in the closed position, as indicated in FIG. 5A, P1 is greater than P2 because the inlet and outlet sides of the butterfly valve 100 are isolated from each other by the valve plate 208. As the valve plate 208 begins to open, as depicted in FIG. 5B, the fluid beings to flow from the upstream side to the downstream side of the butterfly valve 100. As this occurs, the local pressure near the lip 502 of the mounting portion will begin to reduce. However, the pressure near the extent of the gate portion 210 that is upstream from the remainder of the valve member 104 will still be generally at a pressure P1. This fluid flow will create an uneven pressure balance on the valve plate 208 that acts to close the butterfly valve 100.

To overcome this effect, the lip 502 causes an additional amount of torque about the axis of rotation of valve member 104 as a result of the increased radius from the radially-outwardly-projecting lip 502, and the interaction of the fluid therewith. This increased amount of torque aids in overcoming the tendency of the valve member 104 to close during operation.

Put differently, the lip 502 captures a portion of the high velocity jet created when the valve plate 208 begins to open and creates a pressure head in the location of the lip 502. The pressure head works to offset the uneven pressure balance on the valve plate 208, thereby eliminating the tendency to close the butterfly valve 100.

To accommodate the radially-outwardly-projecting lip 502 when the valve plate is in a closed position (as shown in FIG. 5A), a outward step 504 is present on the downward stream side of the valve body 202. The outward step 504 is advantageous because, as seen in FIG. 5C, when the butterfly valve 100 is in the open position the mounting portion 212 of valve plate 208 and part of the first and second shaft portions 204, 206 are directly in the path of fluid flow, on the downstream side. Typically, this would hinder the fluid flow, but the outward step 504 presents a larger flow path on the downstream side, which works to counteract the negative effect of having part of the first and second shaft portions 204, 206 and the mounting portion 212 of the valve plate 208 in the path of fluid flow.

Additionally, by having part of the first and second shaft portions 204, 206 and the mounting portion 212 of the valve plate 208 in the downstream side of the butterfly valve 100 the portion of the valve plate 208 that extends into the upstream side of the butterfly valve 100 can have variable thickness. Therefore, the thickness of the valve plate 208 that extends into the upstream side of the butterfly valve 100 can be made even thinner in order to further reduce the flow-path blockage when in the open position. Yet the portion of the valve plate 208 that remains in the downstream side of the butterfly valve 100 can be thicker to increase the mechanical strength of the valve plate 208.

Although not shown in FIGS. 5A-5C, the leading end of the tube 102 is positioned within the upper and lower gaps 240, 242 formed respectively between the gate portion and the terminal flanges 236, 238 of the first and second shaft portions 204, 206. It will be recognized that such a configuration permits the gate portion 210 to extend into the interior space of the tube 102 bounded by the inner periphery of the tube 102.

Figure 6:
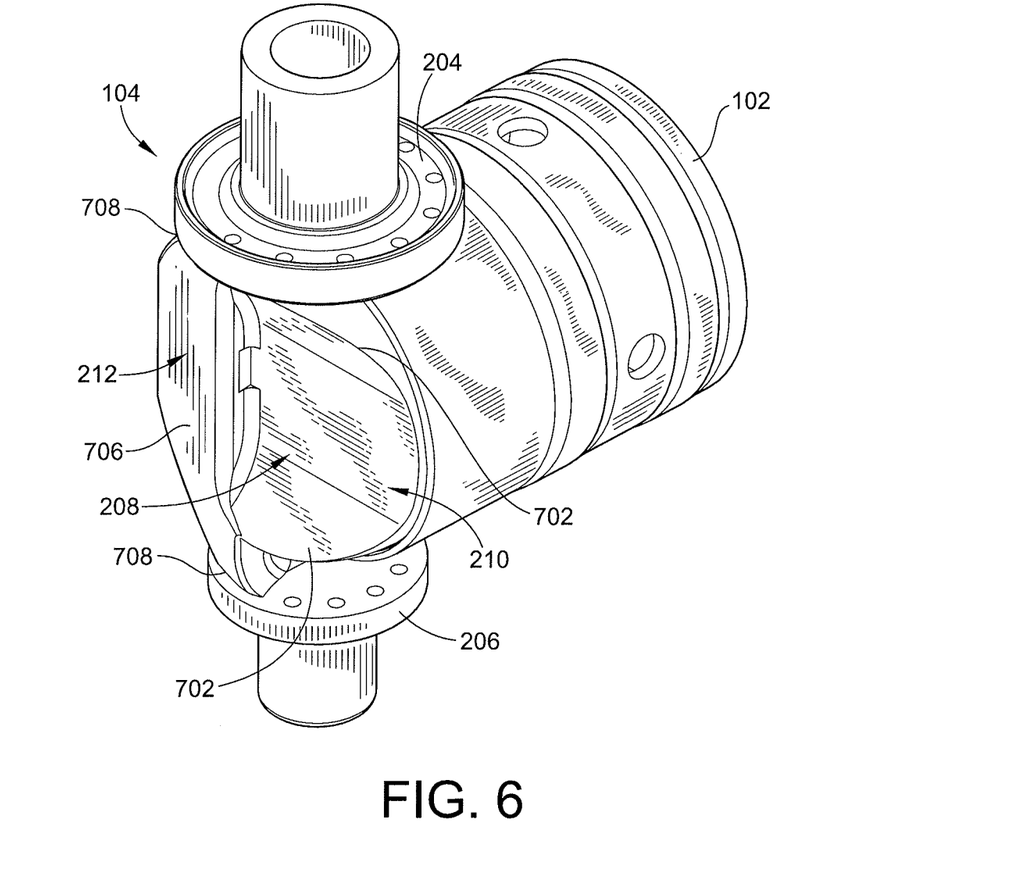
FIG. 6 is a perspective view of the valve member of FIG. 3 engaging a tube of the valve of FIG. 1.

FIG. 6 shows a perspective of the valve plate 208 and the tube 102 from the downstream side of the butterfly valve 100 when in the close position. The aforementioned difference in thickness between the upstream side and the downstream side of the valve plate 208 is clearly shown. The gate portion 210 is thinner than the mounting portion 212. Also, the valve plate 208 has ribs 702 that run circumferentially along the gate portion 210 and meet with a step 706 at the beginning of the mounting portion 212. Therefore, when the valve member 104 is in the open position all of the gate portion 210 (thinner portion), including the ribs 702 are in the upstream portion of the butterfly valve 100, and all of the mounting portion 212 (thicker portion), including the step portion 706 are in the downstream portion of the butterfly valve 100.

Furthermore, by having the valve plate 208 held in place by the first shaft portion 204 and second shaft portion 206, but only connected at the mounting portion 212, gaps 708 exist between the first and second shaft portions 204, 206 and the gate portion 210. The gaps 708 allow the valve member to rotate ninety degrees such that fluid can flow through the butterfly valve 100. By having the gaps 708, a structure used to hold the valve plate 208, typically seen in standard butterfly valves, is not needed. Therefore, a reduction of the overall envelope of the valve body 202 is achieved.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A butterfly valve having an open position to allow fluid flow therethrough, and a closed position to prevent fluid flow therethrough, the butterfly valve comprising:

a housing having an inlet and an outlet with a flow path extending from the inlet to the outlet;

a valve member having a valve plate to selectively allow and prevent fluid flow from the inlet to the outlet along the flow path;

a tube positioned within the flow path and adjacent the valve member to selectively form a seal therewith;

wherein the valve plate includes a radially-outwardly-projecting lip such that one portion of the valve plate extends radially beyond the outer periphery of the tube, and another portion of the valve plate does not extend radially beyond the outer periphery of the tube; and wherein the valve plate includes a mounting portion with a step and a gate portion with a pair of ribs that each extend from the step along a portion of the circumference of the valve plate such that the pair of support ribs are separate and in an opposed spaced relationship on a back surface of the valve plate which faces the outlet in the closed position of the butterfly valve.

2. The butterfly valve of claim 1, wherein the tube is made of a compliant material.

3. The butterfly valve of claim 1, wherein the valve plate includes an axially-projecting flange that is normal to the direction of fluid flow when the valve member is in the closed position, the axially projecting flange forming a radial seal with an inner periphery of the tube when the valve is in the closed position thereby preventing fluid flow through the valve.

4. The butterfly valve of claim 1, wherein the valve plate remains entirely in the flow path when the butterfly valve is in the open position.

5. The butterfly valve of claim 4, wherein the valve plate is rotatable about ninety degrees between a fully closed position and a fully open position, and rotatable about ninety degrees between a fully open position and a fully closed position.

6. The butterfly valve of claim 1, wherein the valve plate is a single continuous structure formed from a continuous piece of material.

7. The butterfly valve of claim 1, wherein the valve plate has a variable thickness.

8. The butterfly valve of claim 1, the housing has a pocket projecting radially into an interior wall of the housing to accommodate the radially-outwardly-projecting lip of the valve plate.

9. The butterfly valve of claim 1, wherein the valve member includes a first shaft portion and second shaft portion, with the valve plate interposed between the first and second shaft portions, and wherein the mounting portion connects the valve plate to the first and second shaft portions, an upper gap being formed between the gate portion and the first shaft portion, and a lower gap being formed between the gate portion and the second shaft portion.

10. A butterfly valve having an open position to allow fluid flow therethrough, and a closed position to prevent fluid flow therethrough, the butterfly valve comprising:
    a housing having an inlet and an outlet with a flow path extending from the inlet to the outlet;
    a tube positioned within the flow path
    a valve member having a first and second shaft portions, with a valve plate extending therebetween, the valve plate having a gate portion and a mounting portion extending radially outward from the gate portion, wherein the first and second shafts are connected to the valve plate at the mounting portion, and wherein the mounting portion defines an outer peripheral edge that is radially outward from an outer diameter of the tube and radially outward from an outer diameter of the gate portion; and
    wherein a step is formed between the mounting onion and the gate portion on a back surface of the valve plate which faces the outlet in the closed position of the butterfly valve, the step extending parallel to the flow path in the closed position of the butterfly valve, and wherein the mounting portion radially increases in width moving from an outer peripheral edge of the mounting portion to the step.

11. The butterfly valve of claim 10, wherein a radially-outwardly-projecting lip extends from the mounting portion, such that the valve plate is non-circular in shape.

12. The butterfly valve of claim 10, wherein the first and second shaft portions are axially aligned with a gap between the first and second shaft portions and the gate portion.

13. The butterfly valve of claim 10, wherein a portion of the first shaft portion and a portion of the second shaft portion, and the mounting portion are downstream from the tube when the butterfly valve is in the open position.

14. The butterfly valve of claim 13, wherein the flow path increases in diameter downstream of the tube.

15. The butterfly valve of claim 14, wherein the mounting portion is thicker than the gate portion such that the valve plate has a variable thickness.

16. The butterfly valve of claim 10, wherein the tube is fit inside the housing adjacent the inlet.

17. A butterfly valve having an open position to allow fluid flow therethrough, and a closed position to prevent fluid flow therethrough, the butterfly valve comprising:
    a housing having an inlet and an outlet with a flow path extending from the inlet to the outlet;
    a tube positioned within the flow path;
    a valve member having a first and a second shaft, with a valve plate extending therebetween, the valve plate having a mounting portion and a gate portion extending radially outward from the mounting portion, wherein the mounting portion is connected to the first and second shafts at a circumference thereof such that rotation of the first and second shafts results in a like rotation of the gate portion;
    a compliant sealing flange extending circumferentially across and axially outward from the mounting portion and the gate portion; the compliant sealing flange being axially received within an inner diameter of the tube in the closed position; and
    wherein the valve plate is mounted between the first and second shafts such that the valve plate is only supported by the first and second shafts and is free of an additional support structure; and
    wherein a maximum width of the mounting portion measured parallel to the flow path when the butterfly valve is in the closed position is less than a maximum diameter of the first shaft and a maximum diameter of the second shaft.

18. The butterfly valve of claim 17, wherein the compliant sealing flange forms a seal with the tube when the butterfly valve is in the closed position.

19. The butterfly valve of claim 17, wherein the valve plate is connected to the first and second shafts at the mounting portion, and wherein an upper gap is formed between the gate portion and the first shaft, and a lower gap is formed between the gate portion and the second shaft.

20. The butterfly valve of claim 19, wherein the tube is made of a compliant material, and an end thereof is received in the upper and lower gaps when the valve is in the open position.

21. The butterfly valve of claim 19, wherein the valve plate includes a radially outwardly projecting lip on the mounting portion such that the mounting portion extends radially outward beyond an outer periphery of the tube in the closed position, and the gate portion does not extend radially outward beyond the outer periphery of the tube in the closed position.

* * * * *

UNITED STATES PATENT AND TRADEMARK OFFICE
CERTIFICATE OF CORRECTION

PATENT NO. : 9,027,907 B2  
APPLICATION NO. : 13/117988  
DATED : May 12, 2015  
INVENTOR(S) : Barry T. Brinks et al.

It is certified that error appears in the above-identified patent and that said Letters Patent is hereby corrected as shown below:

In the Claims,

Column 9, line 55, remove the word "onion" and insert the word --portion--

Signed and Sealed this
Twenty-ninth Day of September, 2015

Michelle K. Lee
*Director of the United States Patent and Trademark Office*